(12) United States Patent
Fan et al.

(10) Patent No.: US 9,719,386 B2
(45) Date of Patent: Aug. 1, 2017

(54) MULTI-LOBED SOOT BLOWER

(71) Applicant: TENNECO AUTOMOTIVE OPERATING COMPANY INC., Lake Forest, IL (US)

(72) Inventors: Gaofeng Fan, Shanghai (CN); Biao Du, Shanghai (CN); Lin Wang, Shanghai (CN); Jianqiang Fan, Shanghai (CN); Anzhou Wu, Shanghai (CN); Jian Wu, Shanghai (CN); Michael Golin, Dexter, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 0 days.

(21) Appl. No.: 14/764,847

(22) PCT Filed: Jan. 31, 2013

(86) PCT No.: PCT/CN2013/071187
§ 371 (c)(1),
(2) Date: Jul. 30, 2015

(87) PCT Pub. No.: WO2014/117357
PCT Pub. Date: Aug. 7, 2014

(65) Prior Publication Data
US 2016/0053643 A1    Feb. 25, 2016

(51) Int. Cl.
*F01N 3/00* (2006.01)
*F01N 3/023* (2006.01)
(Continued)

(52) U.S. Cl.
CPC ......... *F01N 3/0233* (2013.01); *F01N 3/2066* (2013.01); *F01N 3/2093* (2013.01);
(Continued)

(58) Field of Classification Search
CPC .... F01N 13/017; F01N 3/0233; F01N 3/2066; F01N 3/2093; F01N 2610/1453
See application file for complete search history.

(56) References Cited

U.S. PATENT DOCUMENTS

| 4,456,057 A | 6/1984 | Melcer |
| 4,803,959 A | 2/1989 | Sherrick et al. |

(Continued)

FOREIGN PATENT DOCUMENTS

| CN | 85105365 A | 9/1985 |
| CN | 101598057 A | 12/2009 |

(Continued)

OTHER PUBLICATIONS

"Latest Information on SCR Technology for Marine Application"; Herbert Romich, 23 pages, JICEF Seminar Aug. 23, 2011.

(Continued)

*Primary Examiner* — Mark Laurenzi
*Assistant Examiner* — Matthew T Largi
(74) *Attorney, Agent, or Firm* — Harness, Dickey & Pierce, P.L.C.

(57) ABSTRACT

An exhaust after-treatment system including at least one exhaust treatment component (18); and a particulate matter dispersion device (40) located upstream of the exhaust treatment component (18). The particulate matter dispersion device (40) includes at least one nozzle line (61) having a plurality of nozzles (58) formed therein, and the particulate matter dispersion device (40) is operable to inject compressed gas towards the exhaust treatment component (18) to substantially minimize build-up of particulate matter at the exhaust treatment component (18).

17 Claims, 13 Drawing Sheets

(51) Int. Cl.
*F01N 3/20* (2006.01)
*F01N 13/00* (2010.01)

(52) U.S. Cl.
CPC .... *F01N 13/017* (2014.06); *F01N 2610/1453* (2013.01); *Y02T 10/24* (2013.01)

(56) References Cited

U.S. PATENT DOCUMENTS

| | | | |
|---|---|---|---|
| 5,423,483 A | 6/1995 | Schwade | |
| 5,549,725 A | 8/1996 | Kasai et al. | |
| 5,611,198 A * | 3/1997 | Lane | B01D 53/9409 422/170 |
| 5,619,771 A | 4/1997 | Minic | |
| 6,050,088 A * | 4/2000 | Brenner | B01D 53/90 239/553.3 |
| 6,314,722 B1 | 11/2001 | Matros et al. | |
| 6,571,420 B1 | 6/2003 | Healy et al. | |
| 6,575,122 B2 | 6/2003 | Hipple | |
| 6,892,679 B2 | 5/2005 | Jameel et al. | |
| 7,404,290 B2 * | 7/2008 | Gaiser | F01N 3/103 60/286 |
| 7,448,207 B2 * | 11/2008 | Jozsa | B01F 3/04021 60/274 |
| 7,500,437 B2 | 3/2009 | Lefebvre et al. | |
| 7,584,604 B2 * | 9/2009 | Masaki | B01F 3/04049 239/437 |
| 7,762,061 B2 * | 7/2010 | Birkby | F01N 3/0253 222/145.5 |
| 7,767,027 B2 | 8/2010 | Schiffer et al. | |
| 7,832,366 B2 | 11/2010 | Hutton et al. | |
| 7,954,313 B2 * | 6/2011 | Hirata | B01D 53/944 60/286 |
| 8,191,353 B2 * | 6/2012 | Kakinohana | F01N 3/021 60/274 |
| 8,239,998 B2 | 8/2012 | Schwade et al. | |
| 8,800,271 B2 | 8/2014 | Hwang et al. | |
| 2006/0127286 A1 | 6/2006 | Underwood et al. | |
| 2007/0068146 A1 | 3/2007 | Rolffs et al. | |
| 2008/0060348 A1 * | 3/2008 | Robel | B01D 53/9431 60/295 |
| 2009/0101656 A1 * | 4/2009 | Leonard | B01D 53/9431 220/562 |
| 2009/0308060 A1 * | 12/2009 | Suzuki | B01D 46/0058 60/311 |
| 2011/0132414 A1 | 6/2011 | Bruendermann | |
| 2011/0258991 A1 * | 10/2011 | Hwang | F01N 3/2053 60/295 |
| 2012/0096838 A1 * | 4/2012 | Sandberg | B01F 3/04049 60/274 |
| 2012/0269705 A1 | 10/2012 | Jensen et al. | |

FOREIGN PATENT DOCUMENTS

| | | |
|---|---|---|
| CN | 102132019 A | 7/2011 |
| CN | 202675320 U | 1/2013 |
| CN | 202675972 U | 1/2013 |
| CN | 202692090 U | 1/2013 |
| JP | H03249922 A | 11/1991 |
| JP | H08126817 A | 5/1996 |
| KR | 20130010219 A | 1/2013 |
| WO | WO-2011052823 A1 | 5/2011 |
| WO | WO-2012-054437 A2 | 4/2012 |

OTHER PUBLICATIONS

"Advanced Sootblowing Strategy Using SmartSootblower"; Danny Tandra, 36 pages, Dec. 12, 2006.

"Exhaust Gas Cleaning with Selective Catalytic Reduction (SCR)"; Magnus Selás, 148 pages, Jun. 11, 2010.

* cited by examiner

MULTI-LOBED SOOT BLOWER

FIELD

The present disclosure relates to an engine exhaust after-treatment system.

BACKGROUND

This section provides background information related to the present disclosure which is not necessarily prior art.

During operation of a diesel engine, particulate matter and/or soot can be produced and passed into the exhaust stream. To remove particulate matter and/or soot from the exhaust stream, exhaust after-treatment systems have been designed that may include what is known as a diesel particulate filter (DPF). The DPF is designed to filter and remove particulate matter and/or soot from the exhaust stream. The use of a DPF, however, may not be required in various locations around the world and, therefore, the use of the DPF in an exhaust-treatment system in these locations may be omitted.

Notwithstanding, even when a DPF is incorporated into an exhaust treatment system, the DPF does not necessarily remove all the particulate matter and/or soot from the exhaust stream. In such an instance, the remaining particulate matter and/or soot can build-up on other exhaust treatment components, which can reduce their operational efficiency and, eventually, plug the exhaust treatment component. It is desirable, therefore, to provide an exhaust treatment system that includes a component that assists in preventing the build-up of particulate matter and/or soot on exhaust treatment components.

SUMMARY

This section provides a general summary of the disclosure, and is not a comprehensive disclosure of its full scope or all of its features.

The present disclosure provides an exhaust after-treatment system including at least one exhaust treatment component; and a particulate matter dispersion device located upstream of the exhaust treatment component. The particulate matter dispersion device includes at least one nozzle line having a plurality of nozzles formed therein, and the dispersion device is operable to inject a compressed gas towards the exhaust treatment component to substantially minimize build-up of particulate matter at the exhaust treatment component.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
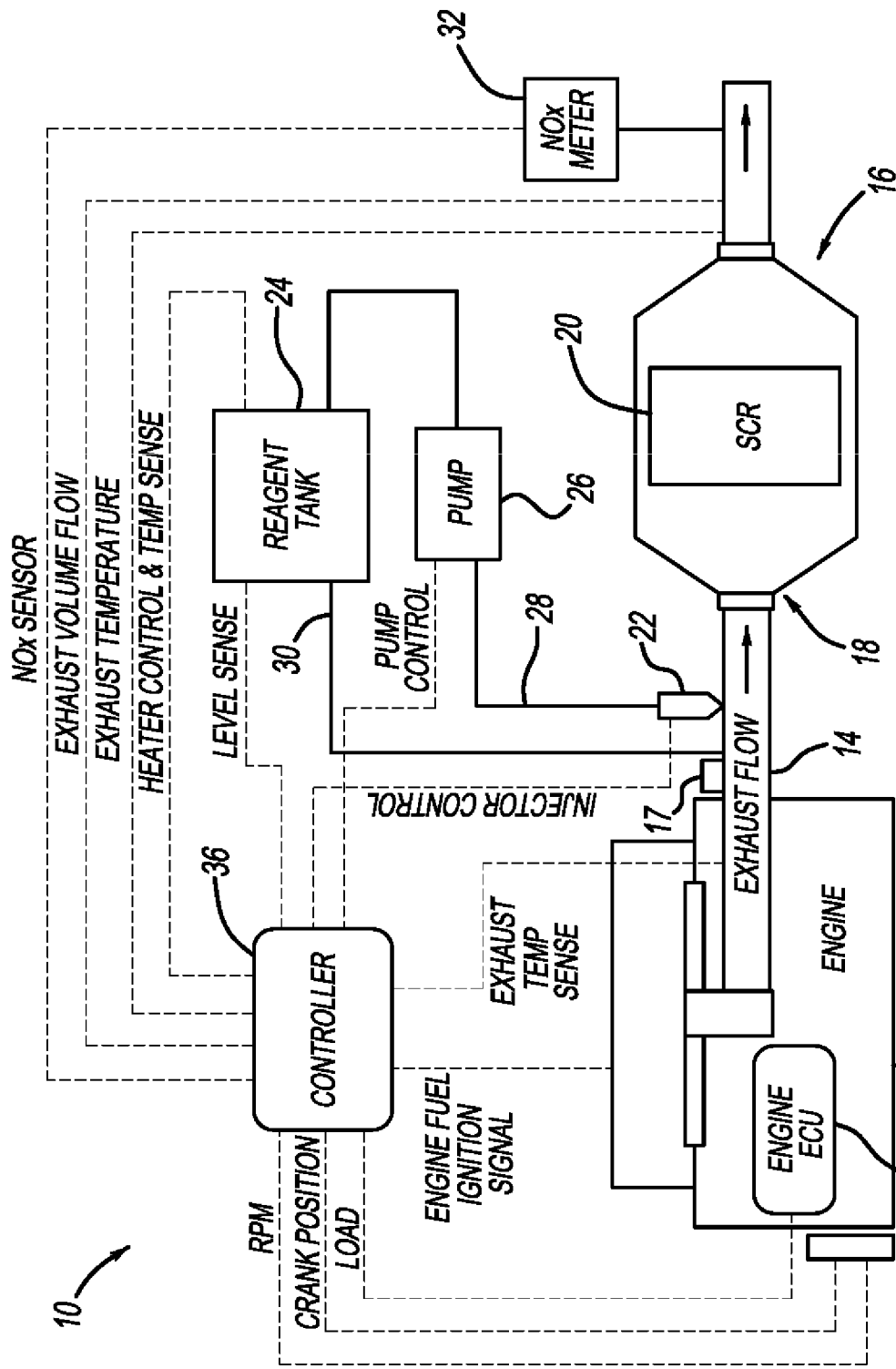
FIG. 1 is a schematic representation of an exhaust system according to a principle of the present disclosure.

FIG. 1 schematically illustrates an exhaust system 10 according to the present disclosure. Exhaust system 10 can include at least an engine 12 in communication with a fuel source (not shown) that, once consumed, will produce exhaust gases that are discharged into an exhaust passage 14 having an exhaust after-treatment system 16. Downstream from engine 12 can be disposed an exhaust treatment component 18, which can be a diesel oxidation catalyst (DOC), a diesel particulate filter (DPF) component, or, as illustrated, a selective catalytic reduction (SCR) component 20. Although not required by the present disclosure, exhaust after-treatment system 16 can further include components such as a thermal enhancement device or burner 17 to increase a temperature of the exhaust gases passing through exhaust passage 24. Increasing the temperature of the exhaust gas is favorable to achieve light-off of the catalyst in the exhaust treatment component 18 in cold-weather conditions and upon start-up of engine 12, as well as initiate regeneration of the exhaust treatment component 18 when the exhaust treatment component 18 is a DPF.

To assist in reduction of the emissions produced by engine 12, exhaust after-treatment system 16 can include a dosing module 22 for periodically dosing an exhaust treatment fluid into the exhaust stream. As illustrated in FIG. 1, dosing module 22 can be located upstream of exhaust treatment component 18, and is operable to inject an exhaust treatment fluid into the exhaust stream. In this regard, dosing module 22 is in fluid communication with a reagent tank 24 and a pump 26 by way of inlet line 28 to dose an exhaust treatment fluid such as diesel fuel or urea into the exhaust passage 24 upstream of exhaust treatment component 20. Dosing module 22 can also be in communication with reagent tank 24 via return line 30. Return line 30 allows for any exhaust treatment fluid not dosed into the exhaust stream to be returned to reagent tank 24. Flow of the exhaust treatment fluid through inlet line 28, dosing module 22, and return line 30 also assists in cooling dosing module 22 so that dosing module 22 does not overheat. Although not illustrated in the drawings, dosing module 22 can be configured to include a cooling jacket that passes a coolant around dosing module 22 to cool it.

The amount of exhaust treatment fluid required to effectively treat the exhaust stream may vary with load, engine speed, exhaust gas temperature, exhaust gas flow, engine fuel injection timing, desired $NO_x$ reduction, barometric pressure, relative humidity, EGR rate and engine coolant temperature. A $NO_x$ sensor or meter 32 may be positioned downstream from SCR 20. $NO_x$ sensor 32 is operable to output a signal indicative of the exhaust $NO_x$ content to an engine control unit 34. All or some of the engine operating parameters may be supplied from engine control unit 34 via the engine/vehicle databus to a reagent electronic dosing controller 36. The reagent electronic dosing controller 36 could also be included as part of the engine control unit 34. Exhaust gas temperature, exhaust gas flow and exhaust back pressure and other vehicle operating parameters may be measured by respective sensors, as indicated in FIG. 1.

The amount of exhaust treatment fluid required to effectively treat the exhaust stream can also be dependent on the size of the engine 12. In this regard, large-scale diesel engines used in locomotives, marine applications, and stationary applications can have exhaust flow rates that exceed the capacity of a single dosing module 22. Accordingly, although only a single dosing module 22 is illustrated for urea dosing, it should be understood that multiple dosing modules 22 for urea injection are contemplated by the present disclosure.

In exhaust treatment systems that do not include a DPF, the build-up of particulate matter or soot can be affect the operation and efficiency of the exhaust treatment system. In particular, the build-up of soot can build-up and begin to plug exhaust treatment components such as a DOC or SCR. To assist in reducing the build-up of soot, the present disclosure provides a soot dispersion device 40 that is operable to assist in preventing build-up of soot deposits on the face of the catalyst-coated substrates of either a DOC or SCR 20. Soot dispersion device (hereinafter "soot blower") 40 is in communication with a source of compressed air 42 that blows toward exhaust treatment device 18 to disperse any particulate matter or soot that may be located at an inlet 44 of exhaust treatment device. In this manner, particulate matter and/or soot can be prevented, or least substantially minimized, from building up on the face of the exhaust treatment device 20.

Figure 2:
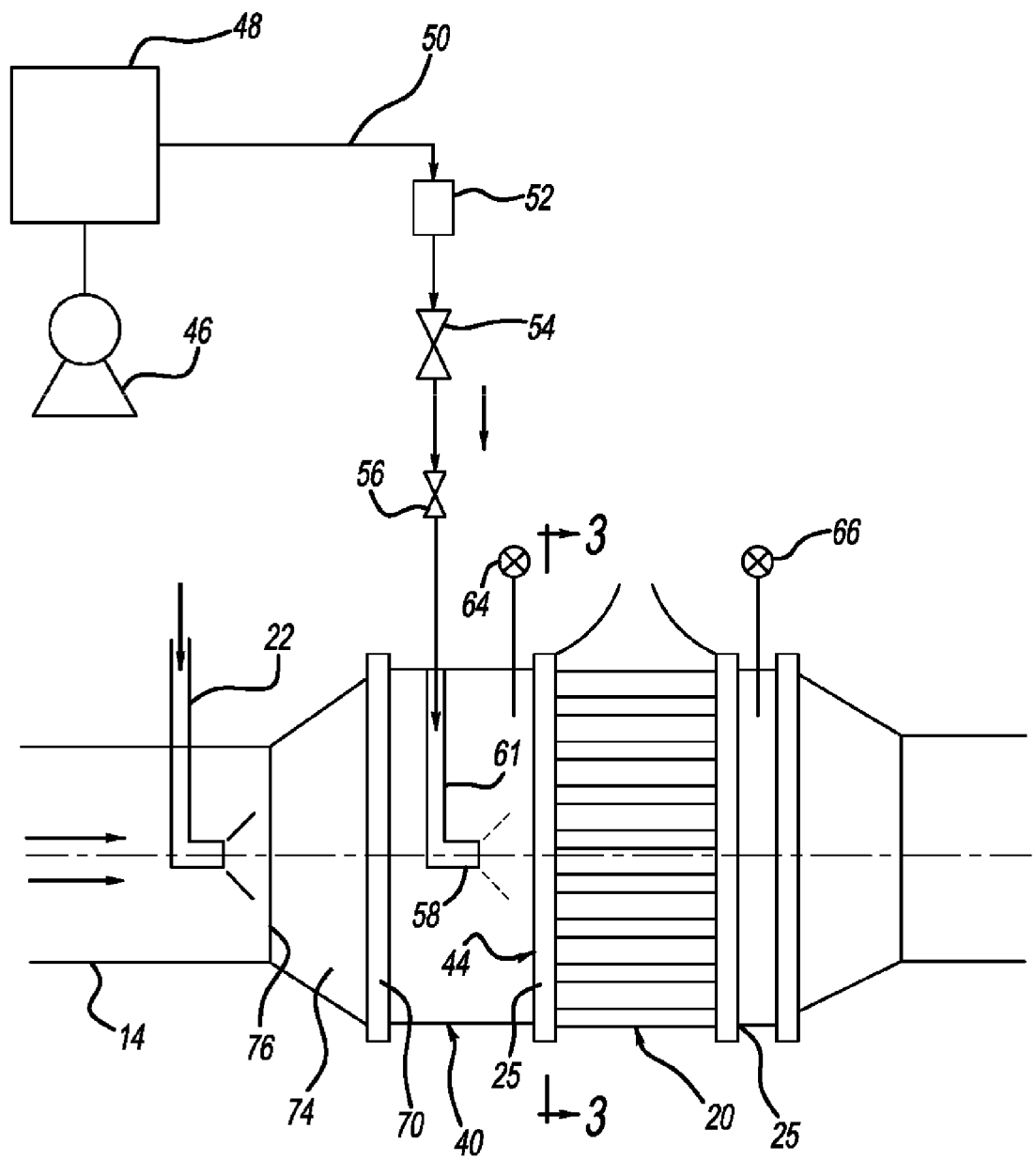
FIGS. 2 and 3 are schematic representations of an exhaust treatment system including a soot blower according to a principle of the present disclosure.
Figure 3:
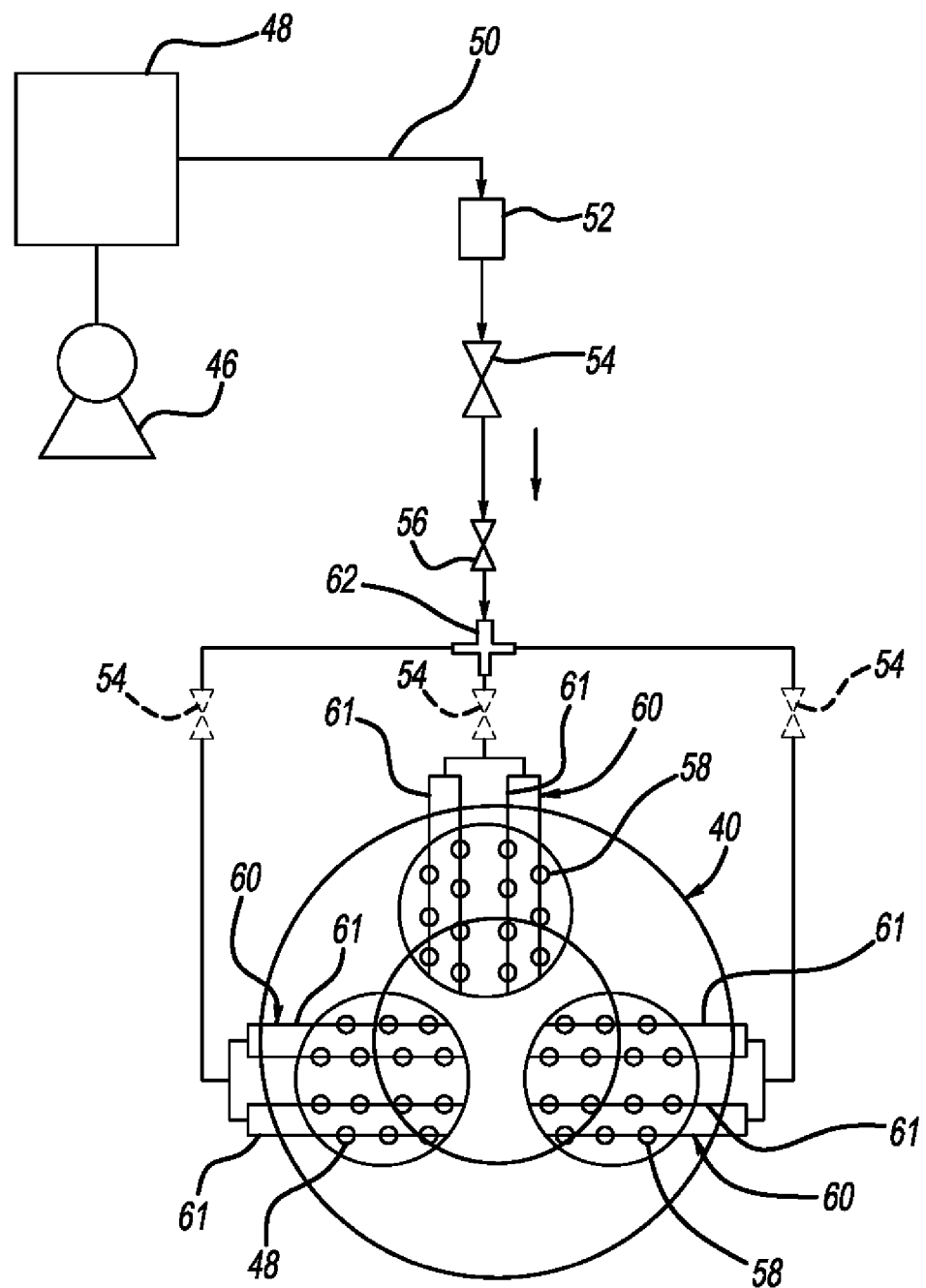

FIGS. 2 and 3 schematically illustrate an exhaust treatment system 18 including soot blower 40. As illustrated in FIGS. 2 and 3, soot blower 40 is located directly upstream from inlet 44 of exhaust treatment device 20, which in the illustrated embodiment is an SCR. It should be understood, however, that exhaust treatment device 20 can also be a DOC or catalyst-coated DPF without departing from the scope of the present disclosure. To provide compressed air to soot blower 40, exhaust treatment system includes a compressor 46 that is operable to draw in ambient air from the atmosphere, or draw in air from an on-board source (not shown). Air compressed by compressor 46 may be stored in an accumulator 48 and fed, when needed, through an inlet line 50 through an air filter 52, an impulse valve 54, an optional check valve 56, to soot blower 40. To disperse the compressed air over exhaust treatment component 20, soot blower includes a plurality of nozzles 58. As best shown in FIG. 3, soot blower 40 can include a plurality of arrays 60 of nozzle lines 61 each including a plurality of nozzles 58. To provide compressed air to each nozzle line 60, a diverter valve 62 can be located upstream from nozzle lines 60 that provides compressed air to each array 60.

It should be understood that each array 60 of nozzle lines 61 can be independently actuatable. In this regard, it should be understood that although impulse valve 54 is illustrated in FIG. 3 as being upstream of diverter valve 62, the use of multiple impulse valves 54 located downstream from diverter valve 62 is contemplated. That is, each array 60 can include an impulse valve 54 that can control flow of compressed gas thereto. Moreover, although not illustrated in the drawings, it should be understood that each individual nozzle line 61 can also be independently actuatable. That is, each respective nozzle line 61 can also include a valve (not shown) that allows each nozzle line 61 to be independently operable.

Although soot blower 40 assists in preventing build-up of particulate matter and/or soot on exhaust treatment component 20, the pressure within exhaust treatment system 18 should still be closely monitored. To monitor the pressure in exhaust treatment system 18, a first pressure sensor 64 can be located upstream of exhaust treatment component 20 and a second pressure sensor 66 can be located downstream of exhaust treatment component 20. Monitoring the pressure at locations upstream and downstream of exhaust treatment component 20 assists in determining whether soot blower 40 is properly functioning. In this regard, if soot blower 40 is not properly functioning, the build-up of particulate matter and/or soot on exhaust treatment component 20 can begin to plug the passages through exhaust treatment component 20, which can cause an increase of back-pressure in exhaust treatment system 18. If too much back-pressure develops in system 18, engine 12 performance can be negatively affected. Furthermore, if too much back-pressure develops in system 18, it can be a sign that soot blower 40 needs to be serviced.

Although soot blower 40 assists in preventing the build-up of particulate matter and/or soot on exhaust treatment component, it should be understood that maintenance of exhaust treatment system 18 is periodically required. That is, even with the addition of soot blower 40 to exhaust treatment system 18, exhaust treatment component 20 may require cleaning to remove particulate matter and/or soot from the passages therein. If pressure readings indicate that pressure within the system 18 is rising, it may be a signal that exhaust treatment component 20 and/or system 18 requires maintenance.

Figure 4:
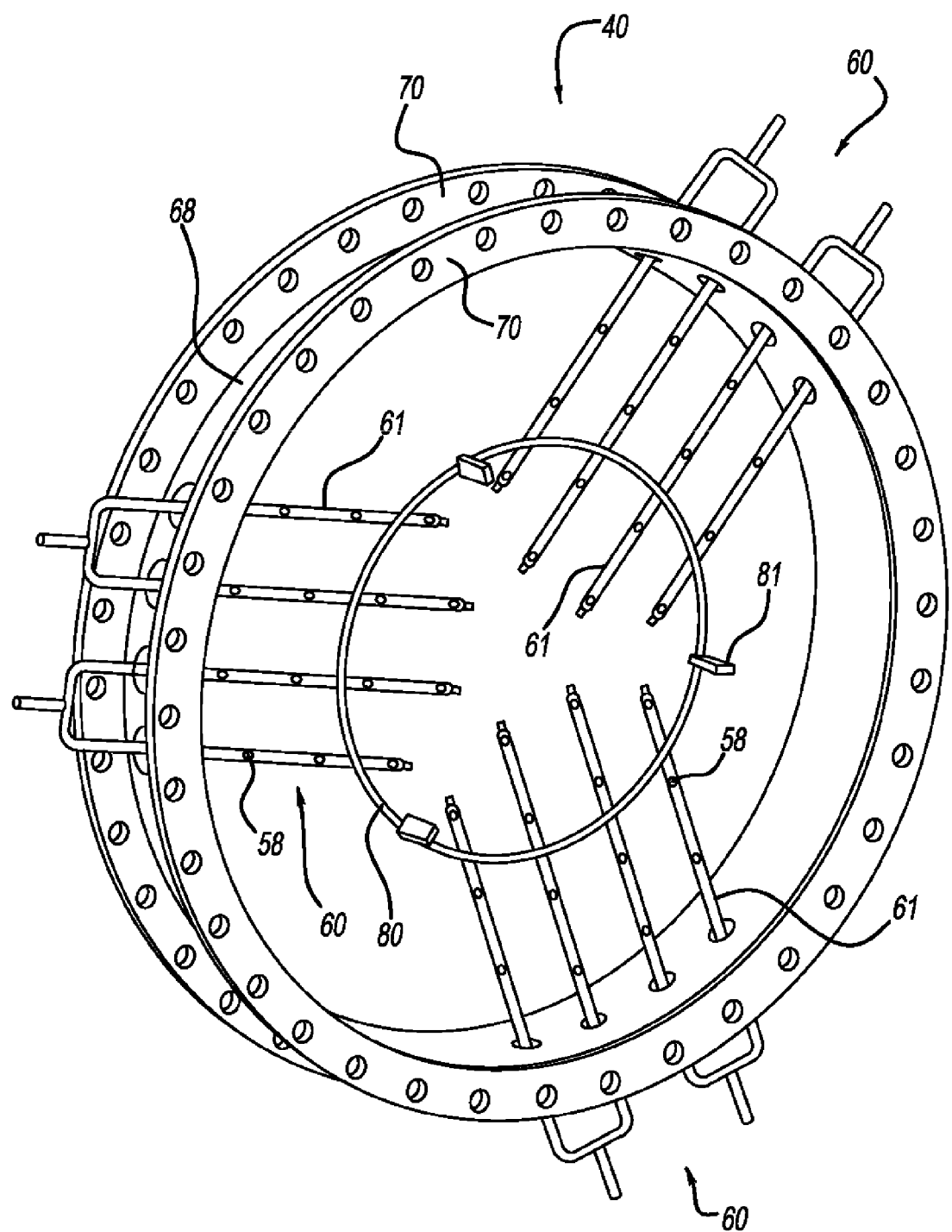
FIG. 4 is a perspective view of a soot blower according to a principle of the present disclosure.
Figure 5:
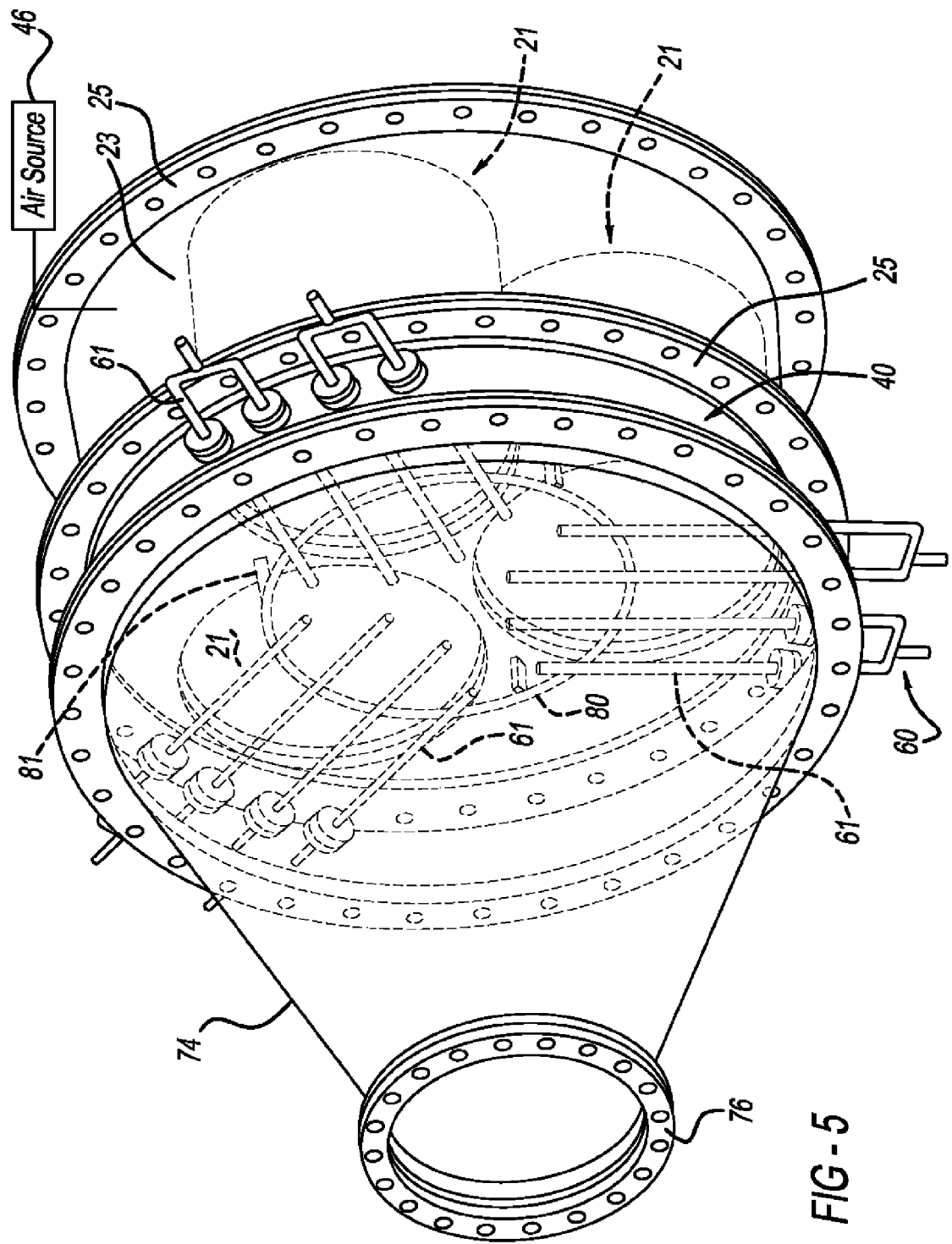
FIG. 5 is a perspective view of an exhaust treatment component including a soot blower according to a principle of the present disclosure.
Figure 6:
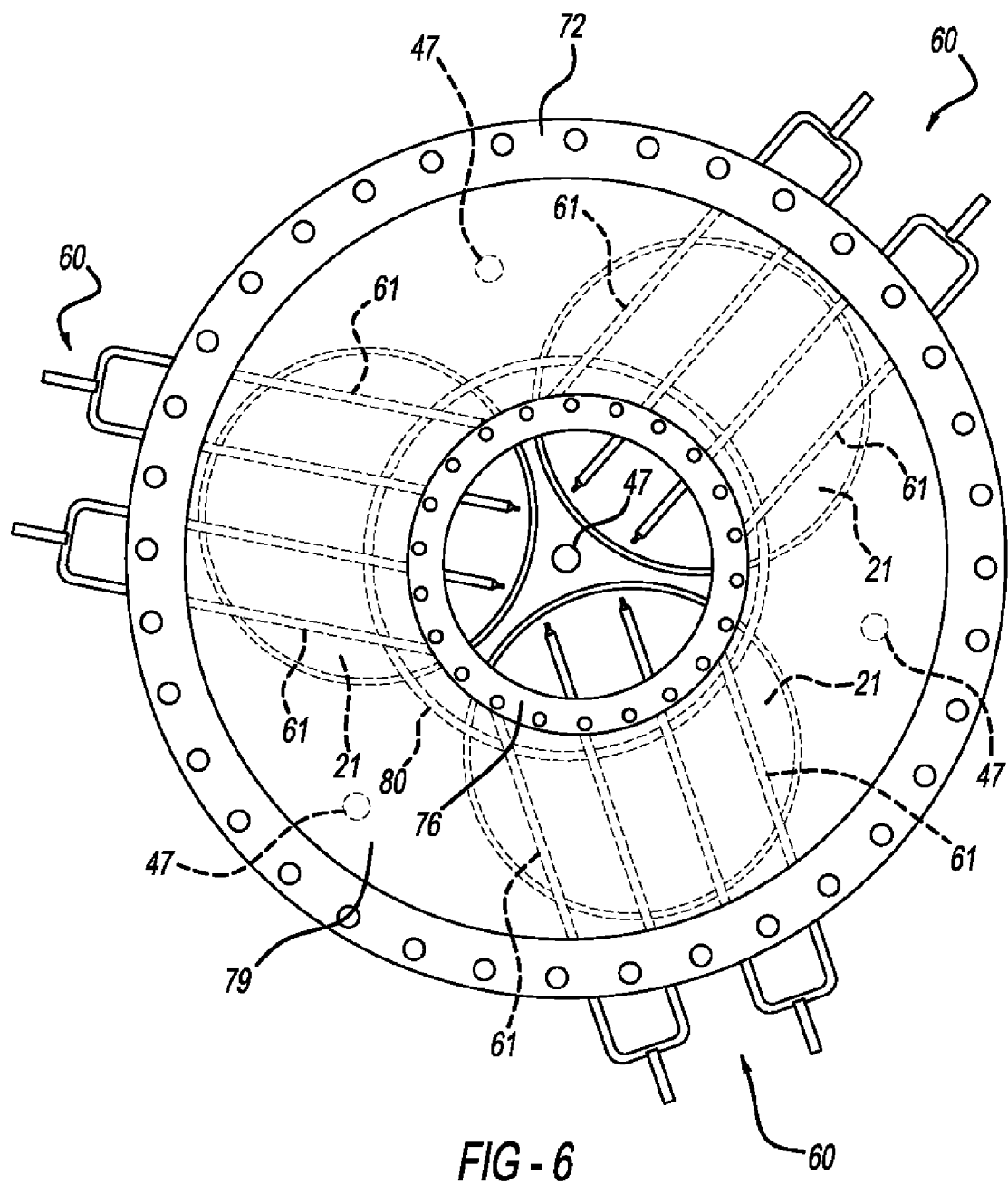
FIG. 6 is a front perspective view of the exhaust component including a soot blower illustrated in FIG. 5.
Figure 7:
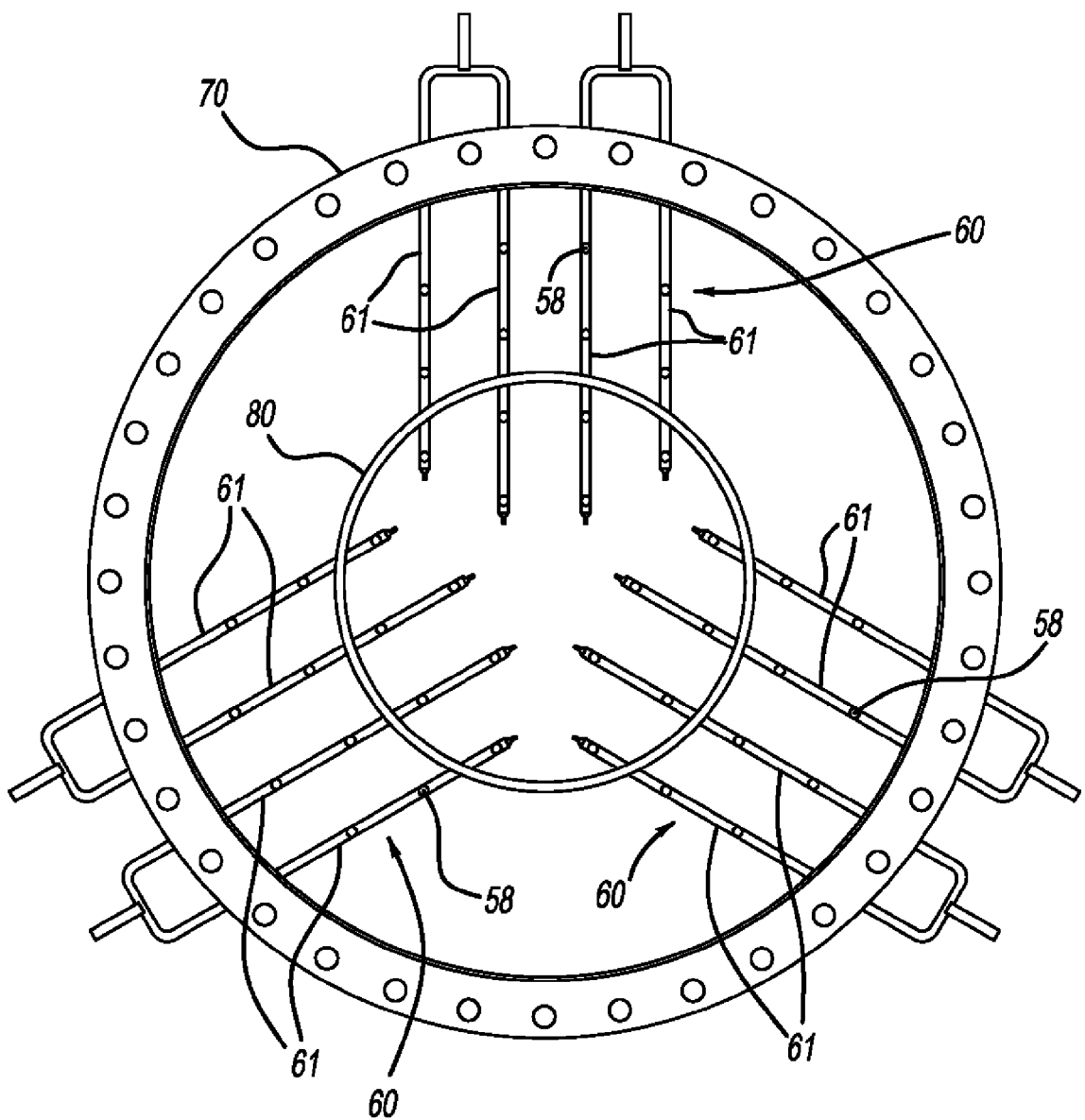
FIG. 7 is a front-perspective view of a soot blower according to a principle of the present disclosure.
Figure 8:
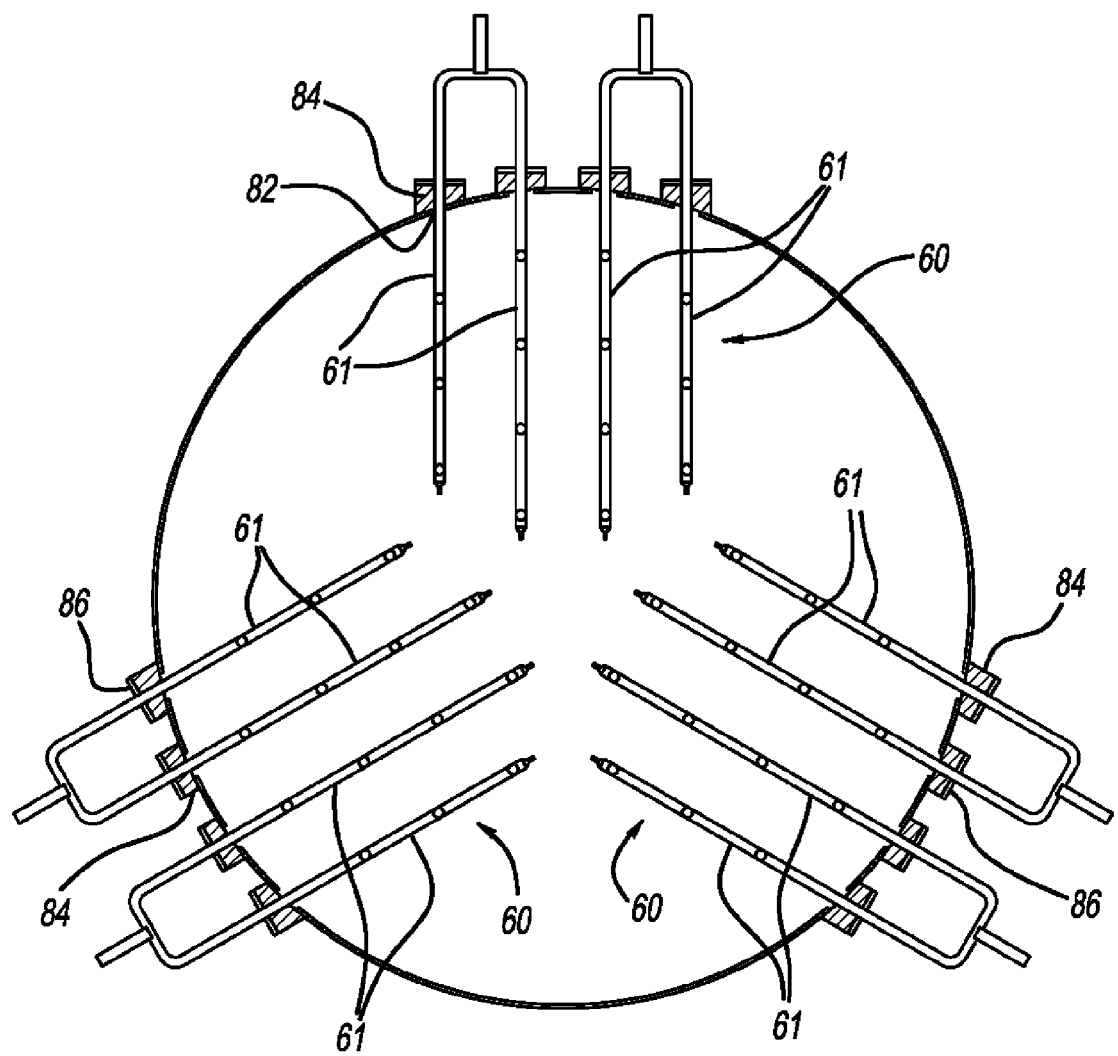
FIG. 8 is a cross-sectional view of the soot blower illustrate din FIG. 7.
Figure 9:
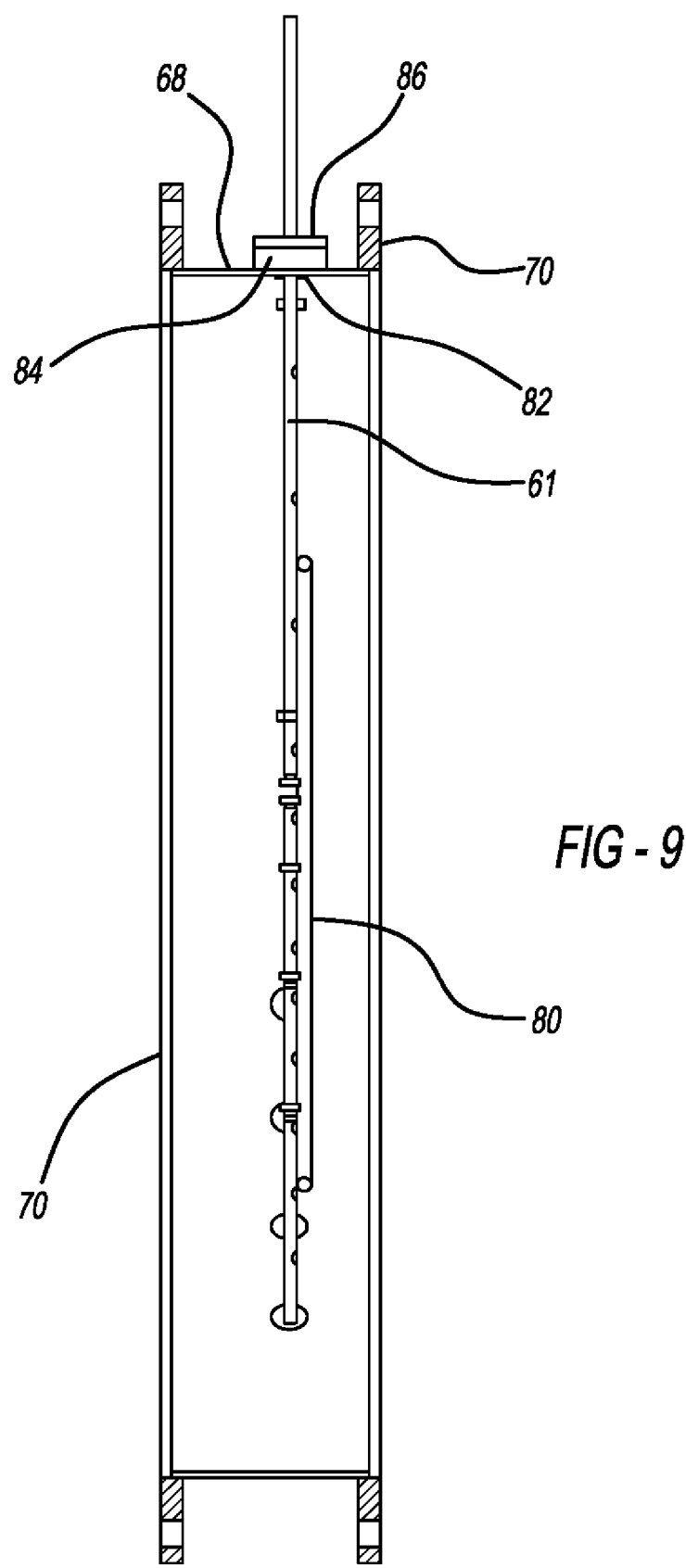
FIG. 9 is a side cross-sectional view of the soot blower illustrated in FIG. 7.
Figure 10:
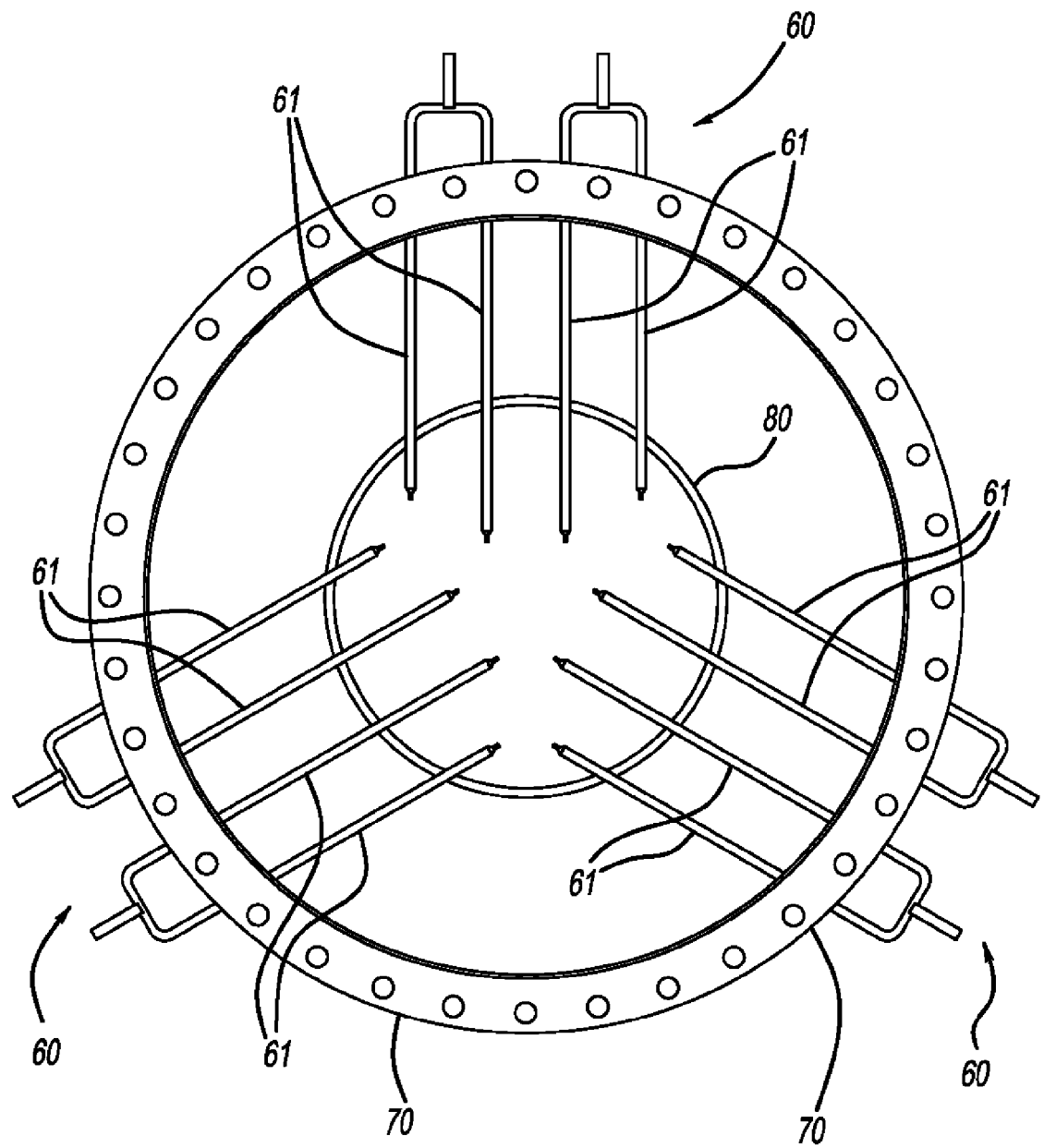
FIG. 10 is a rear perspective view of the soot blower illustrated in FIG. 7.

FIGS. 4-6 are perspective views of soot blower 40, as well as an exhaust treatment component 20 including soot blower 40 located directly upstream of soot blower 40. Soot blower 40, in the illustrated embodiment, is designed for a large engine application such as a marine, stationary, or locomotive engine application where large amounts of exhaust are produced during operation of engine 12. In this regard, instead of using a single SCR substrate to treat the engine exhaust, the exhaust treatment component 20 includes a plurality of SCR substrates 21 arranged in a single canister 23 that houses each of the SCR substrates 21. On either side of canister 23 are formed connection flanges 25 that allow canister 23 to be secured to other exhaust components of the exhaust treatment system 18 located either upstream or downstream of canister 23.

Soot blower 40 includes a housing 68 and a pair of connection flanges 70 that couple to a connection flange 25 of canister 23, as well as to a connection flange 72 of an exhaust treatment component inlet 74. Connection flanges 25, 70, and 72 allow each component 23, 40, and 74 to be bolted together in a hermetic manner that prevents exhaust gases from escaping from exhaust treatment system 18 and reaching the atmosphere before being properly treated. Exhaust treatment component inlet 74 also includes an inlet flange 76 that allows exhaust treatment component inlet 74 to be coupled to exhaust passage 14.

As best shown in FIGS. 4 and 7-10, soot blower 40 includes a plurality of arrays 60 of nozzle lines 61, with each nozzle line 61 including a plurality of nozzles 58 for injecting compressed air towards exhaust SCR substrates 21. Each array 60 can be located at locations 120 degrees apart around circular housing 68 of soot blower 40. To ensure that nozzle lines 61 do not contact one another, nozzle lines 61 can have variable lengths. Nozzle lines 61 can be formed of various metal materials including aluminum, steel, copper, or any other material known to one skilled in the art. A reinforcing ring 80 can be used to secure each nozzle line 61 relative to one another, and also serves to increase the robustness of soot blower 40 by decreasing oscillation of nozzle lines 61 that may occur during dosing of the compressed air and exposure to turbulent exhaust flow through exhaust treatment system 18. In addition, ring 80 can include stand-offs 81 that are operable to abut against the partition that supports SCR substrates 21 at positions between SCR substrates 21. Alternatively, it should be understood that terminal ends of nozzle lines 61 can be bent to act as stand-offs 81 without departing from the scope of the present disclosure. Housing 68 can include a plurality of apertures 82 that allow nozzle lines 61 to pass therethrough. To secure nozzle lines 61 at apertures 82, a seat member 84 and gasket 86 can be used.

As noted above, each array 60 can be located at locations 120 degrees apart around circular housing 68 of soot blower 40. Specifically, each array 60 can be located to correspond to a particularly designated SCR substrate 21 to ensure that particulate matter and/or soot is satisfactorily dispersed at each SCR substrate 21. In the illustrated embodiment (e.g., FIGS. 5 and 6), each SCR substrate 21 is located at locations 120 degrees apart around canister 23. Accordingly, arrays 60 of soot blower 40 are correspondingly located at locations 120 degrees apart around housing 68. It should be understood, however, that arrays 60 can be disposed in any manner desired to maximize dispersion of particulate matter and/or soot at SCR substrate 21.

Although dispersing particulate matter and/or soot at the face of the SCR substrate 21 is desirable and preferred, it should be understood that the present disclosure should not be limited thereto. In contrast, it should be understood that the present disclosure also provides a soot blower 40 that is designed to prevent the build-up of particulate matter and/or soot at locations other than the SCR substrate 21 face. More particularly, particulate matter and/or soot can build up at locations other than the SCR substrate 21 face. If too much particulate matter and/or soot builds up at these "dead spots" between SCR substrates 21, the built-up particulate matter and/or soot can eventually break off and plug the SCR substrate 21.

Figure 11:
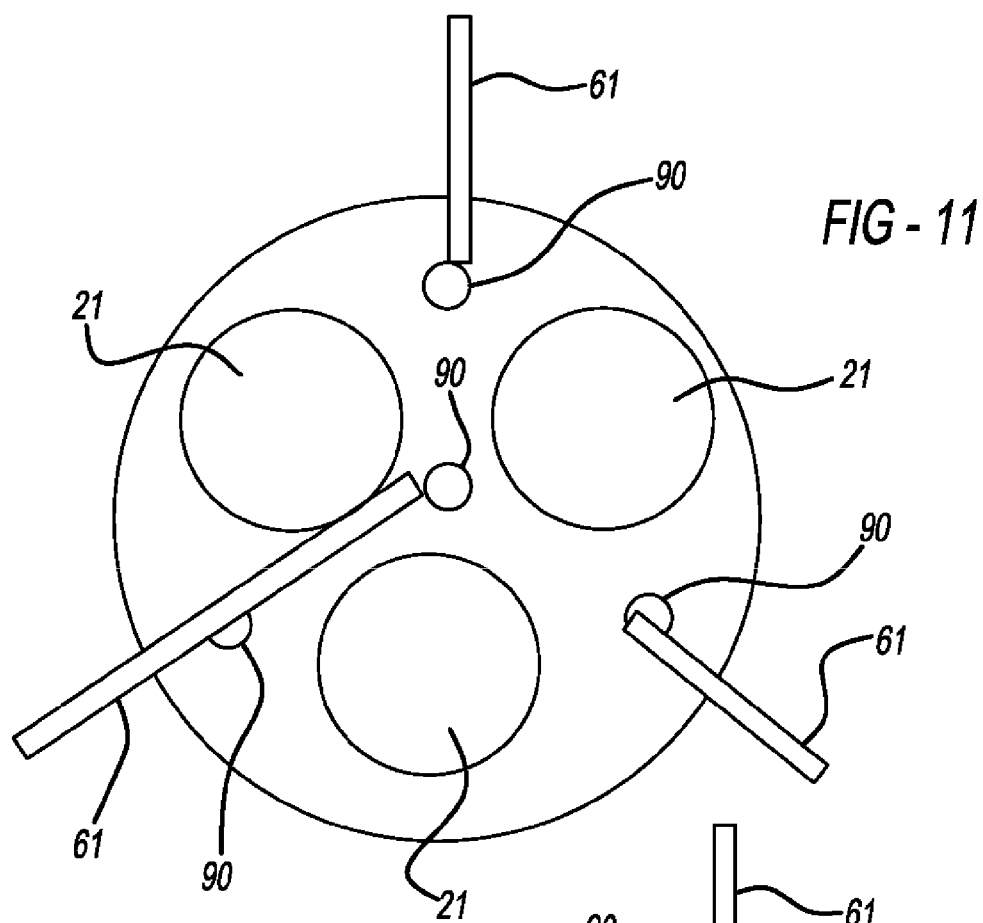
FIG. 11 is a schematic representation of an alternative soot blower configuration according to a principle of the present disclosure.
Figure 12:
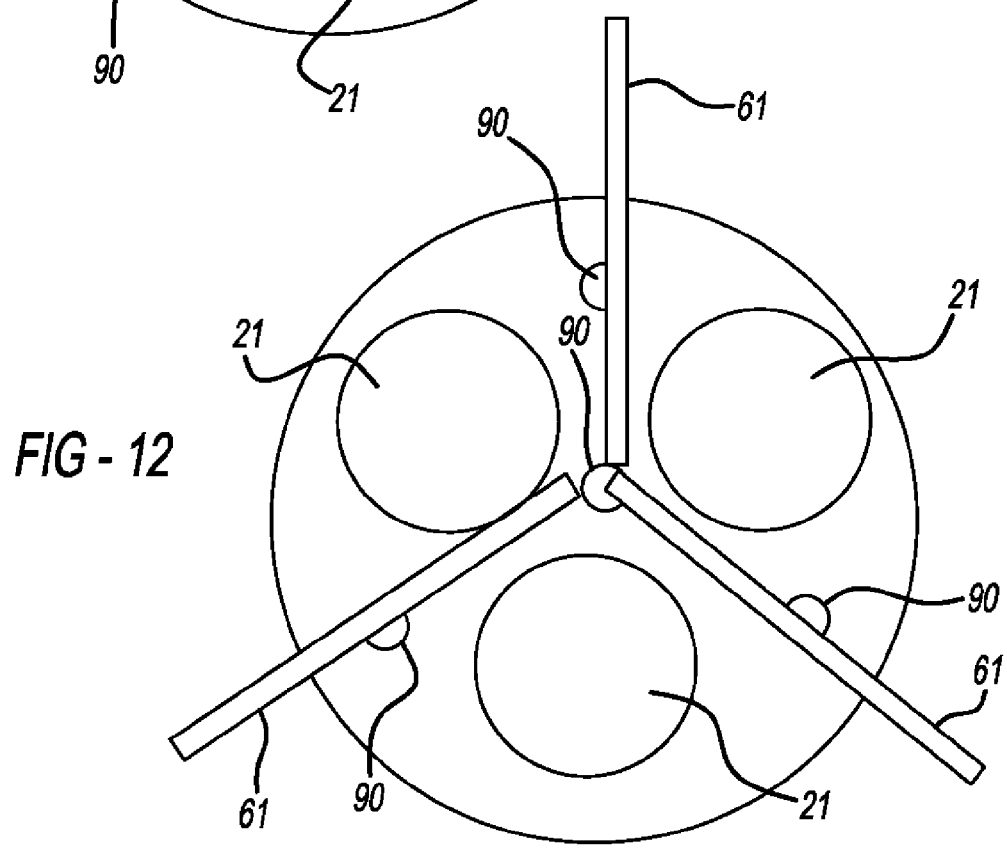
FIG. 12 is a schematic representation of an alternative soot blower configuration according to a principle of the present disclosure.

FIGS. 11 and 12 illustrate configurations of nozzle lines 61 that may be arranged to disperse particulate matter and/or soot at various locations between SCR substrates 21. As shown in FIGS. 11 and 12, dead spots 90 where excess particulate matter and/or soot can develop are located at positions between SCR substrates 21. To prevent build-up of particulate matter and/or soot at dead spots 90, nozzle lines 61 can be configured to blow compressed air at these locations. Alternatively, referring back to FIGS. 5 and 6, because canister 23 can be hermetically sealed, an air source or compressor 46 can be coupled to canister 23 to pressurize canister 23. At locations where dead spots 90 are typically located, nozzles 47 can be formed in the partition that supports SCR substrates 21. As such, when canister 23 is charged with compressed gas from compressor 46, any build-up of soot or particulate matter can be ejected from the dead spot by the nozzles 47. Such a configuration can be used in conjunction with or in lieu of soot blower 40.

Figure 13:
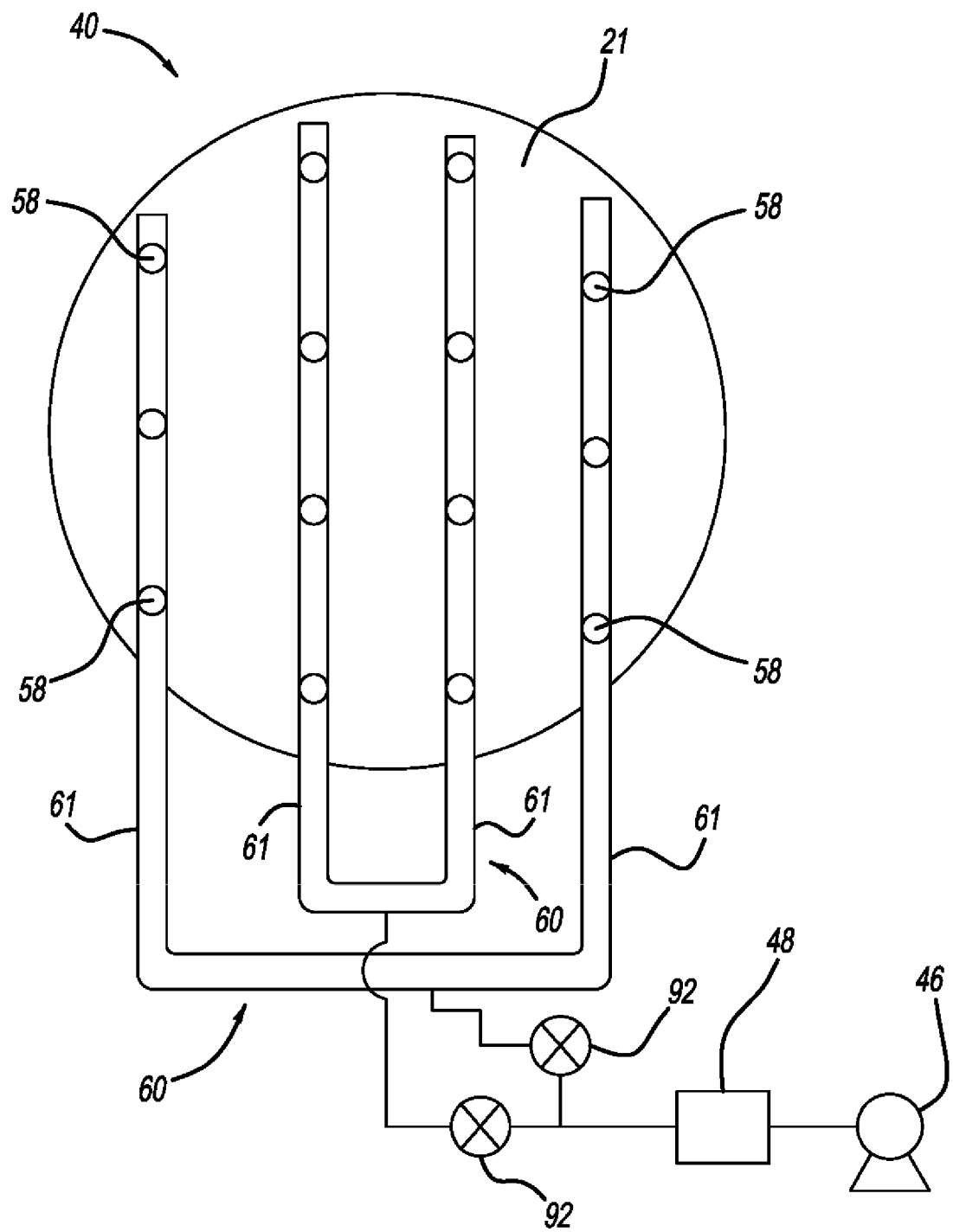
FIG. 13 is a schematic representation of an alternative soot blower configuration according to a principle of the present disclosure.
Figure 14:
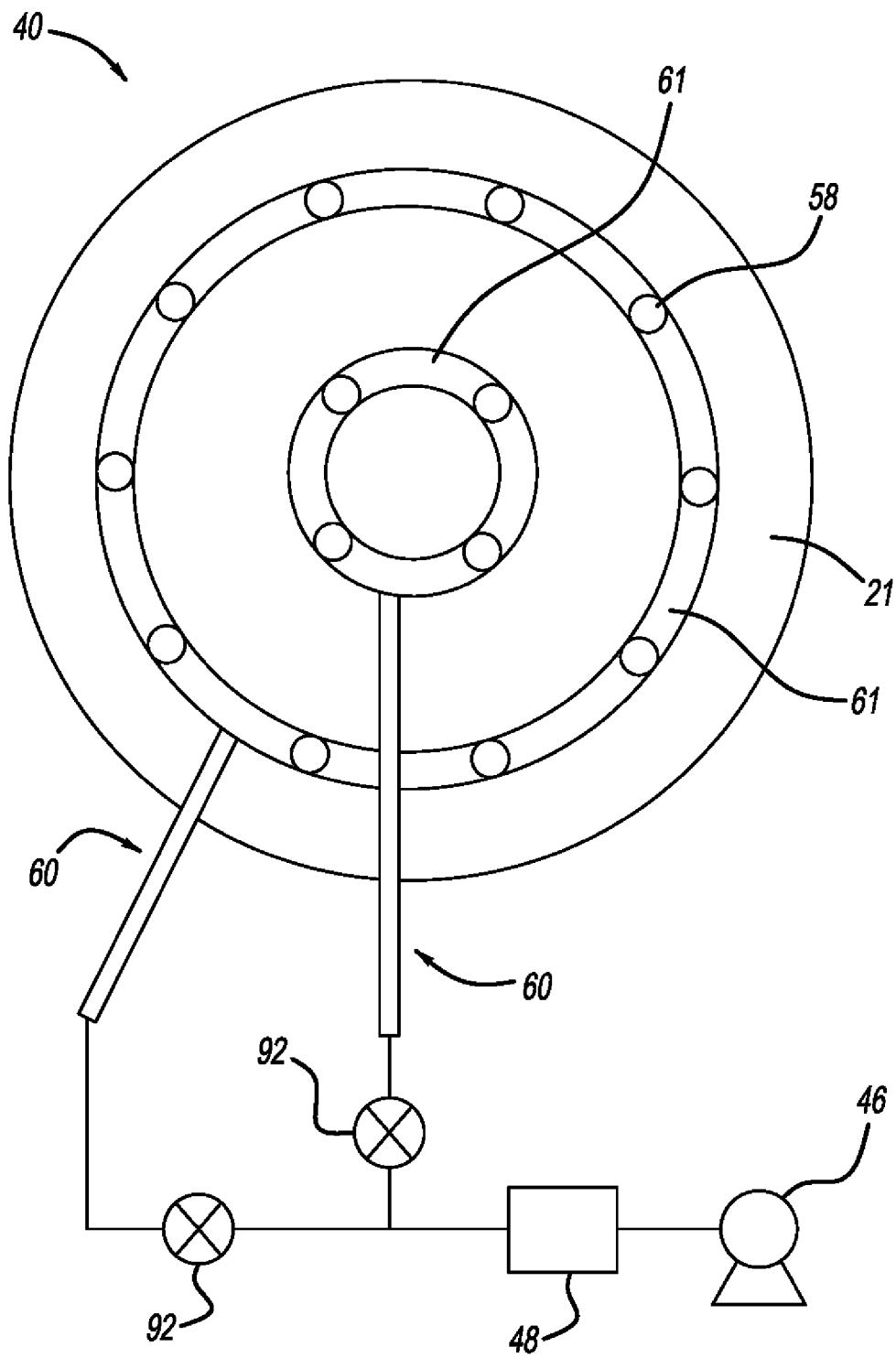
FIG. 14 is a schematic representation of an alternative soot blower configuration according to a principle of the present disclosure.

FIG. 13 illustrates an alternative configuration of a soot blower 40 according to the present disclosure. In lieu of having arrays 60 located at different positions about housing 68 of soot blower, the arrays 60 can be arranged in parallel. In this regard, compressed air is provided by compressor 46 to an optional accumulator 48. From accumulator 48, compressed air can be passed through a pair of valves 92 that provide the compressed gas to a pair of arrays 60 arranged in parallel. Each array 60 can be operated independently. Each array includes nozzle lines 61 having a plurality of nozzles 58 to disperse compressed air of SCR substrate 21. FIG. 14 illustrates yet another alternative configuration of soot blower 40. Each 60 includes a circular nozzle line 61 having a plurality of nozzles 58 formed therein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An exhaust after-treatment system, comprising:
a plurality of exhaust treatment components arranged in parallel, each exhaust treatment component including an inlet end at which particulate matter enters the exhaust treatment component;
a canister containing the plurality of exhaust treatment components, wherein each of the exhaust treatment components of the plurality are spaced apart from one another;
a particulate matter dispersion device located upstream of and adjacent to the inlet ends of each exhaust treatment component,
wherein the particulate matter dispersion device includes at least one nozzle line having a plurality of nozzles formed therein, the dispersion device operable to inject air toward target zones within the canister that are positioned between the inlet ends of at least two of the exhaust treatment components, the air being injected in a non-uniform pattern and concentrated at the target zones to substantially minimize build-up of particulate matter in the canister between the inlet ends of each exhaust treatment component.

2. The exhaust after-treatment system of claim 1, wherein the particulate matter dispersion device including a plurality of arrays of nozzle lines, with each nozzle line having a plurality of nozzles formed therein.

3. The exhaust after-treatment system of claim 2, wherein each nozzle line is linear.

4. The exhaust after-treatment system of claim 2, wherein each nozzle line is annular.

5. The exhaust after-treatment system of claim 1, further comprising a source of compressed air in communication with the particulate matter dispersion device.

6. The exhaust after-treatment system of claim 5, further comprising an accumulator located downstream from the source and upstream from the particulate matter dispersion device and further comprising a valve operable to deliver pulses of compressed air from the accumulator to the particulate matter dispersion device.

7. The exhaust after-treatment system of claim 1, wherein the exhaust treatment component is an SCR exhaust treatment component.

8. The exhaust after-treatment system of claim 1, wherein the exhaust treatment component includes a plurality of SCR exhaust treatment components.

9. The exhaust after-treatment system of claim 8, wherein the particulate matter dispersion device includes a plurality of arrays of nozzle lines, with each nozzle line corresponding to a designated SCR exhaust treatment component.

10. The exhaust after-treatment system of claim 8, wherein the particulate matter dispersion device includes a plurality of arrays of nozzle lines, with each nozzle line corresponding to a designated location between each SCR exhaust treatment component.

11. The exhaust after-treatment system of claim 10, wherein each SCR exhaust treatment component is aligned at their inlet ends and the designated location is a dead spot between SCR exhaust treatment components within a housing containing the nozzle lines and SCR exhaust treatment components.

12. The exhaust after-treatment system of claim 1, further comprising a dosing module for dosing an exhaust treatment fluid.

13. An exhaust after-treatment system, comprising:
a plurality of exhaust treatment components arranged in an array, each exhaust treatment component including an inlet end at which particulate matter enters the exhaust treatment component;
a soot blower located directly upstream from the inlet ends of the plurality of exhaust treatment components, the soot blower including a plurality of arrays of nozzle lines that each include a plurality of nozzles, each array of nozzle lines corresponding to one of the exhaust treatment components;
a source of compressed air in communication with the soot blower, and
a ring fixed to at least one nozzle line from each array of nozzle lines to secure the nozzle lines to one another to decrease oscillations of the nozzle lines during injection of the compressed air;
wherein the compressed air provided to each of the arrays of nozzle lines is directed toward one of a plurality of spaced apart target zones, the target zones being positioned on the inlet end of each of the exhaust treatment components, wherein the air injected by the soot blower is unevenly dispersed and concentrated at the target zones to disperse particulate matter and soot at the exhaust treatment components.

14. The exhaust after-treatment system of claim 13, further comprising an accumulator located downstream from the source and upstream from the particulate matter dispersion device and further comprising a valve operable to deliver pulses of compressed air from the accumulator to the particulate matter dispersion device.

15. The exhaust after-treatment system of claim 13, wherein the exhaust treatment component is an SCR exhaust treatment component.

16. The exhaust after-treatment system of claim 13, wherein each nozzle line is linear.

17. The exhaust after-treatment system of claim 13, further comprising a housing containing the plurality of arrays of nozzle lines, wherein the nozzle lines of each array of nozzle lines extend through the housing and terminate at distal ends within the housing.

* * * * *